(12) United States Patent
Day

(10) Patent No.: US 7,814,542 B1
(45) Date of Patent: Oct. 12, 2010

(54) NETWORK CONNECTION DETECTION AND THROTTLING

(75) Inventor: Mark Stuart Day, Milton, MA (US)

(73) Assignee: Cisco Technology, Inc., San Jose, CA (US)

( * ) Notice: Subject to any disclaimer, the term of this patent is extended or adjusted under 35 U.S.C. 154(b) by 1452 days.

(21) Appl. No.: 10/610,171

(22) Filed: Jun. 30, 2003

(51) Int. Cl.
    *G06F 11/00* (2006.01)
(52) U.S. Cl. .............. 726/22; 726/11; 726/23; 713/188
(58) Field of Classification Search .......... 726/22–25, 726/11; 713/188; 709/223–225
    See application file for complete search history.

(56) References Cited

U.S. PATENT DOCUMENTS

| 6,789,203 | B1 * | 9/2004 | Belissent | 726/22 |
| 6,941,348 | B2 * | 9/2005 | Petry et al. | 709/206 |
| 7,092,387 | B2 * | 8/2006 | Chen et al. | 370/360 |
| 7,159,149 | B2 * | 1/2007 | Spiegel et al. | 714/43 |
| 2002/0103930 | A1 * | 8/2002 | Kamentsky et al. | 709/244 |
| 2003/0223466 | A1 * | 12/2003 | Noronha et al. | 370/537 |

* cited by examiner

*Primary Examiner*—Kimyen Vu
*Assistant Examiner*—Baotran N To
(74) *Attorney, Agent, or Firm*—Hickman Palermo Truong & Becker LLP

(57) ABSTRACT

In an edge network, message traffic between the edge network and a core network passes through the edge router. A port scanning attack directed to the network as a whole (core network) potentially emanates from within the LAN. The edge router includes a network throttling device which identifies and mitigates harmful transmissions such that they do not propagate to the core network. The network throttling device has a connection daemon to scan transactions and determine deviant or atypical connection attempts. A session database stores a transaction history representing a window of previous connection attempts. A pattern detector examines the history and looks for malicious behavior. Identified deviant patterns cause a throttler enforcer to limit the triggering user by restricting future connection attempts, thus mitigating harmful effects. Usage, therefore, is not prevented, but resilience to deviant practices is provided. Accordingly, virus propagation via port scanning is mitigated to a safe level and false alarms targeting legitimate activity are minimized.

18 Claims, 7 Drawing Sheets

*Fig. 7*

| IP ADDRESS | MAC ADDR | PROTOCOL | DEST | TIMESTAMP |
|---|---|---|---|---|
| 191.67.1.1 | AB-12-34-56-78-90 | TCP/IP | 127.1.1.10 | 070403 23:55:01 |
| 191.67.1.1 | AB-12-34-56-78-90 | TCP/IP | 127.1.1.11 | 070403 23:55:02 |
| 191.67.1.1 | AB-12-34-56-78-90 | TCP/IP | 127.1.1.12 | 070403 23:55:03 |
| 191.67.1.2 | AB-12-34-56-78-90 | TCP/IP | 127.1.1.13 | 070403 23:55:04 |
| ......... | | | | |

NETWORK CONNECTION DETECTION AND THROTTLING

BACKGROUND OF THE INVENTION

Modern computer networks employ security detection mechanisms to deter and prevent security attacks by unauthorized entities. Security attacks include viruses, worms and other threats which an attacker introduces by an unauthorized connection into a computer system via a public access network such as the Internet. Such threats often take the form of self-replicating code which propagates from node to node in a network by breaching a system, such as via email or an unprotected port, to gain access to the executable memory area of a victim computer node. Once introduced, the malicious code typically attempts to propagate further around the network by breaching adjacent nodes, sometimes after executing code which produces an undesirable effect on the victim node, such as deleting critical files.

Most security detection mechanisms attempt to prevent unauthorized access altogether, in an absolute manner. Mechanisms such as firewalls, password protection, security filters, and outright physical separation all operate by preventing any unauthorized access beyond a point of implementation of such a security mechanism. These security measures strive for absolute "on or off" access; the security check either passes or fails at the implementation point. Therefore, however, a single successful breach of the security mechanism at the implementation point allows uninhibited access from thereon. There is no inherent authorization "watchdog," or revalidation of authorization, beyond the discrete implementation "gatekeeper" point.

Analysis of certain activities over time, however, may suggest a pattern of activity tending to correspond to illicit usage and potentially malicious and/or improper activity. One such activity is so-called "port scanning," which is generally recognized as an illegitimate activity except possibly in narrow security audit situations. Such activity is usually either a reconnaissance effort that precedes some form of attack on a system, or an effort to evade management of resources. Port scanning involves repeated, rapid attempts to gain access to different systems, and is an activity which a legitimate user is unlikely to perform. Port scanning, therefore, is an electronic equivalent to a thief trying every door on a city block until they find one that opens.

Several prior art systems have attempted to address port scanning. It appears to be widely accepted that port scanning is both generally bad and detectable. Numerous so-called "personal firewalls" purport to block such an attack at a particular end system. Such efforts serve to notify, and typically block, such an attack. Intrusion Detection System (IDS) products collect potentially significant network events from a variety of nodes, and analyze the events in aggregate to ward off false alarms from legitimate activity, potentially modifying "dynamic shunning" firewalls, such as that proposed by Descan.net of Seattle, Wash. The Descan system purports to identify abusive scanning behavior with heuristics and statistical analysis, and then reports the activity to a system administrator.

Another prior art approach is described by Williamson: "Throttling Viruses: Restricting propagation to defeat malicious mobile code," Matthew M. Williamson, Hewlett-Packard Laboratories, Bristol, HPL-2002-172, June 2002. Williamson suggests a filter on a network stack that uses a series of timeouts to restrict the rate of connections to new hosts. Williamson, therefore, appears to be a filter for limiting a rate of allowed connections from an infected node to adjacent nodes, and therefore does not attempt to prevent an initial influx of a virus, but rather to limit the spread from an infected PC.

ForeScout Technologies, Inc., of San Mateo, Calif., proposes focusing on a potential attacker and identifying pre-attack activities to proactively defend against malicious activity (See U.S. Pat. No. 6,363,489, Mar. 26, 2002, "Method for automatic intrusion detection and deflection in a network"). This system arranges to feed disinformation to port scanners and similar reconnaissance techniques so that any subsequent attack has an unmistakable signature. However, such an approach appears to assume substantial preparation and anticipation on the part of the user. A user may not wish to expend resources in such an elaborate anticipatory mechanism.

SUMMARY

Unfortunately, there are problems associated with methods for defending a system against infiltration by self-replicating code (viruses). Defense techniques require widespread deployment to be effective, obscuring the return on investment value identifiable for application to a single machine. Other mechanisms suffer from potential false alarms, restricting or limiting benign transmissions, or by the overhead and computational cost required in maintaining an ongoing bastion of security.

In certain environments, such as college campuses, a relatively large base of installed systems couple loosely with regard to topical usage and interconnect via a LAN which is itself connected to a larger public access network such as the Internet. In such an environment, port scanning scenarios are likely to occur, not only because of the potential for untrusted users inside the LAN (subnetwork), but also because of widespread use of port scanning file sharing systems. In this context, in which legitimate uses of port scanning are present, a security defense cannot eliminate port scanning altogether, but rather must distinguish benign operations from harmful or malicious activities. Merely limiting or capping throughput will likely restrict or prohibit such benign port scanning activities. A virus defense approach to such a system lends itself primarily to containing the threat, rather than mere detection or complete elimination.

Such LANs often interconnect to the larger network according to an edge and core architecture. This type of architecture provides a switching infrastructure, or core network, of core routers connected to edge routers serving the edge networks. Generally, the core routers communicate with other routers and the edge routers communicate with the edge networks, or user LANs. Therefore, an edge network interconnects to the core network via an edge router.

In an edge network, therefore, message traffic between the edge network and the core network passes through the edge router serving the edge network. An attack directed to the network as a whole (core network) could emanate from anywhere within the edge network LAN. However, the edge router transports all message traffic between the edge network and the core network. It would be beneficial, therefore, to provide port scanning protection in the edge router to identify and mitigate harmful transmissions at the edge network such that they do not propagate to the core network, and which does not hinder legitimate transmissions.

Williamson, above, does not appear to address the notion of protecting a larger network. Rather, the Williamson approach prevents an infected PC from subsequently infecting its neighbors. This somewhat altruistic approach, similar to keeping one's sick child from attending school so as not to infect others, requires widespread deployment in order to be effective over a large area. Since mitigation of a harmful propagation from a single, "immunized" PC may limit malign transmissions from that individual source, other "carriers" (PCs) are likely to have been infected, and therefore such an approach requires widespread dissemination. It may be difficult, however, to convince a large user community to install potentially throughput-limiting applications when the benefit is afforded not to preventing infection of their own PC, but rather to afford protection to those they might infect. Indeed, many users may be hesitant to install such an application, and would likely prefer to expend resources towards safeguarding their own machine, rather than their neighbors' machine.

The Descan approach, as described above, does not disclose conclusory analysis or remedial action to be taken in response to the identified activity. Accordingly, the Descan system appears to report notable activity, but does not appear to address isolation or limiting propagation in an edge network to protect a core network.

The ForeScout system, similarly, inasmuch as it focuses on the attacker, appears to impose a two step process which requires first identifying reconnaissance activities which may constitute a threat, and then combating the corresponding attack by restricting the purported attacker. Such an analysis and conclusion based approach appears to involve substantial complexity. Further, an erroneous trigger by a legitimate user would nonetheless absolutely prevent legitimate activity by the user deemed attacker.

The present invention substantially overcomes the problems with absolute restrictions on transmission capability to mitigate problems caused by a malicious or erroneous user. A network throttling device has a connection daemon to scan transactions and determine connection attempts made by various users on the network. The device stores identified connection attempts in a session database operable to store a transaction history representing a window of previous connection attempts. The session database therefore stores a sequence of recent connection attempts. A pattern detector examines the sequence and looks for patterns corresponding to malicious or erroneous behavior. Patterns such as repeated "Pings" (connection attempts) to incrementing addresses may be indicative of scanning for available ports. Rapid and usually unsuccessful attempts within a fixed time interval may indicate random stabs at remote systems.

Once the pattern detector identifies a deviant pattern, a throttler enforcer attempts to limit the triggering user by restricting future connection attempts. Such restricting, or throttling, does not absolutely prevent the user from connecting, but reduces it to a level consistent with normal usage, thus mitigating any harmful effects due to rapid connection attempts. In this manner, no manner of usage is absolutely prevented, but resilience to harmful, deviant practices, whether malicious or erroneous, is provided. Accordingly, threats from virus propagation via port scanning are mitigated to a safe level, false alarms targeting legitimate activity are minimized, and slowdown effects caused by triggers have a minimal effect on such legitimate patterns of activity.

For example, a typical user may issue a substantial number of connection attempts during a Web browser session. A typical browsing pattern may be to scan a half a dozen or so Web pages before pausing for brief time to read the contents of a page. Accordingly, a sequence of say, 6-10 connection attempts to the remote nodes (web servers) is followed by a period of one to several minutes of inactivity. A malicious sequence of connection attempts, such as that exhibited by a port scanning scenario, on the contrary, might attempts to connect 100 times in one second. Such connection attempts are further characterized in that large percentage of the connections will be unsuccessful, and will typically apply toward ordered sequences of IP addresses, most often incrementing by one, or some other identifiable pattern or interval.

By way of further example, imagine a line of parked cars along a street. A passerby flipping up a door handle on a single car would likely not be cause for alarm. However, a would-be thief might attempt a routine such as trying the door handle of every car in a row, hoping to find one unlocked. Accordingly, the single passerby trying one door handle does not appear suspicious, however, the repeated pattern of attempting every door handle in sequence seems indicative of a break-in attempt, and would be much more likely to evoke the response by onlookers such as law enforcement personnel.

Given the above examples, it is apparent that certain patterns of connection activity are indicative of undesirable, deviant operations in the network. Limiting the number of connection attempts in a given time, for a user who appears to be rapidly trying to connect to sequential addresses, mitigates the ability of the user to gain access to a large number of systems. Similarly, the legitimate user browsing web addresses is unlikely to be hindered by a limitation in the number of outgoing connections in a given time interval, since the legitimate user would likely pause to read a page in the interim, since a benign browsing pattern connection rate is well below a typical malign pattern. Further, even in the event of a legitimate user transmission triggering a slowdown, such a slowdown is likely to be almost imperceptible to the user.

In further detail, the present invention is a system for protecting a core network from an edge network, or subnetwork, by identifying and limiting malign transmissions via the network connection detection and throttling mechanism and apparatus described herein. The network throttling device identifies, at a interconnection point such as an edge router operable to interconnect the core network and the edge network, connection attempts from among transactions issued by a network user. The connection daemon detects and intercepts each attempt to initiate a communication, such as opening a TCP/IP connection, or other network transaction of interest. The pattern detector then compares a series of identified connection attempts (transactions) to connection patterns indicative of deviant activity, and stores such connection attempts and other transactions to employ for detecting future patterns. The pattern detector maintains a small history, such as source address, protocol, destination address and destination port, about a predetermined number of previous initiation attempts for each known source address on the subnetwork. A throttler enforcer then restricts, if the series of connection attempts corresponds to patterns of deviant activity, the connection attempts according to a recurrence threshold, the recurrence threshold operable to limit the frequency of the connection attempts. Therefore, the throttler enforcer buffers pending transactions (connection attempts) for the source users for which the pattern detector found a pattern of deviant activity (i.e. potentially engaging in port scanning or other malicious activity).

In a particular configuration, the connection daemon identifies the connection attempts according to transactions having known sequences according to a predetermined protocol, such as TCP/IP. Known protocols typically include identifiable type and field structures allowing enumeration of connection transactions.

The pattern detector maintains a transaction history indicative of previous connection attempts in a session database having one or more transaction tables and/or related data structures. The transaction history allows analysis of a previous number of buffered transactions for detecting a malign pattern of use. The session database maintains the transaction history according to a predetermined history threshold, the history threshold selected according to an interval containing sufficient transactions to be indicative of deviant connection attempts. Further, the stored (buffered) intervening connection attempts are also available for successive issuance according to the recurrence threshold. By buffering transactions which are malign, rather than rejecting them or sending them to a "bit bucket," the pattern detector merely delays issuance, therefore mitigating negative effects of conservative analysis.

The pattern detector employs deviance logic for detecting deviant connection attempts, in which the deviance logic is operable to determine an excessive frequency of outgoing connection attempts. The deviance logic may include parameters, constants, and other computations for dynamically and/or statically computing a threshold of activity for which limiting transactions for the user in question is appropriate. Accordingly, the deviance logic is operable to compute deviant or atypical activity according to a plurality of metrics, such as an excessive number of outgoing connection attempts within a predetermined connection window threshold, by computing transactions corresponding to an ordered sequence of addresses, and by determining transactions to infrequently accessed addresses.

Further, detection of such deviant activity triggers limiting by the throttling enforcer. The throttler enforcer limits successive connection transactions (potentially deviant activity) according to a transaction recurrence threshold. The throttler enforcer may periodically readjust the recurrence threshold for the deviant user in question, such that recurring malicious attempts trigger stronger restrictions, and, in the case of erroneous detecting or a possibly non-malicious or careless user, legitimate connections remain minimally delayed. In particular arrangements, the throttler enforcer recomputes the recurrence threshold upon detection of successive deviant connection attempts. The recomputing of the recurrence threshold may occur in a graduating manner proportional to the frequency of connection attempts, and the throttler enforcer may recomputed the recurrence threshold according to a binary exponential backoff.

Further, the network throttling device or the data communications device employing network throttling as above may apply to an edge network (subnetwork) of a larger network from a single deployment point, rather than focusing on a single user's machine. The system administrator or other entity charged with protecting the edge network (subnetwork) such as a LAN deploys the network throttling device between the edge network and the larger network, the LAN therefore effectively comprising a subset of a larger network and the data communications device being a sole connection thoroughfare from the edge network LAN to the larger network. Such an arrangement ensures that deviant activity occurring within the edge network is subject to detecting and throttling by the network throttling device before potentially "infecting" the larger network.

The features of the invention, as described above, may be employed in systems, data communications devices and methods, as well as other computer-related components such as those of Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

FIG. 7 is the transaction table in the session database of FIG. 3 in greater detail as employed in the example of FIG. 6.

DETAILED DESCRIPTION

In a conventional computer network system having a core network interconnecting a plurality of LANs functioning as edge networks, message traffic between the edge network and the core network passes through an edge router serving the edge network. A malicious attack directed to the network as a whole (core network) could emanate from anywhere within the LANs. However, the edge router transports all message traffic between the edge network and the core network. Embodiments of the invention are based in part on the observation that it would be beneficial, therefore, to provide a network throttling device operable for port scanning protection in the edge router to identify and mitigate, or limit, harmful transmissions at the edge network such that they do not propagate to the core network, and which also does not hinder legitimate transmissions between the edge network (subnetwork) and the core network, including the Internet.

Embodiments of the invention substantially overcome the problems with absolute restrictions on transmission capability to mitigate problems caused by a malicious or erroneous user. A network throttling device has a connection daemon to scan transactions and determine connection attempts made by various users on the network. The network throttling device stores the identified connection attempts in a session database operable to store a transaction history representing a window of previous connection attempts. The session database therefore stores a sequence of recent connection attempts. A pattern detector examines the sequence and looks for patterns corresponding to malicious or erroneous behavior. Patterns such as repeated "Pings" (connection attempts) to incrementing addresses may be indicative of scanning for available ports. Rapid and usually unsuccessful attempts within a fixed time interval may indicate random connection attempts to remote systems.

Once the pattern detector identifies a deviant or atypical pattern, the throttler enforcer attempts to restrict the triggering user by limiting future connection attempts. Such restricting, or throttling, does not absolutely prevent the user from connecting, but reduces it to a level consistent with normal usage, thus mitigating any harmful effects. In this manner, no manner of usage is absolutely prevented, but resilience to harmful, deviant practices, whether malicious or erroneous, is provided. Accordingly, threats presented by port scanning are mitigated to a safe level, false alarms targeting legitimate activity are minimized, and slowdown effects caused by such limiting have a minimal effect on legitimate patents of activity.

Figure 1:
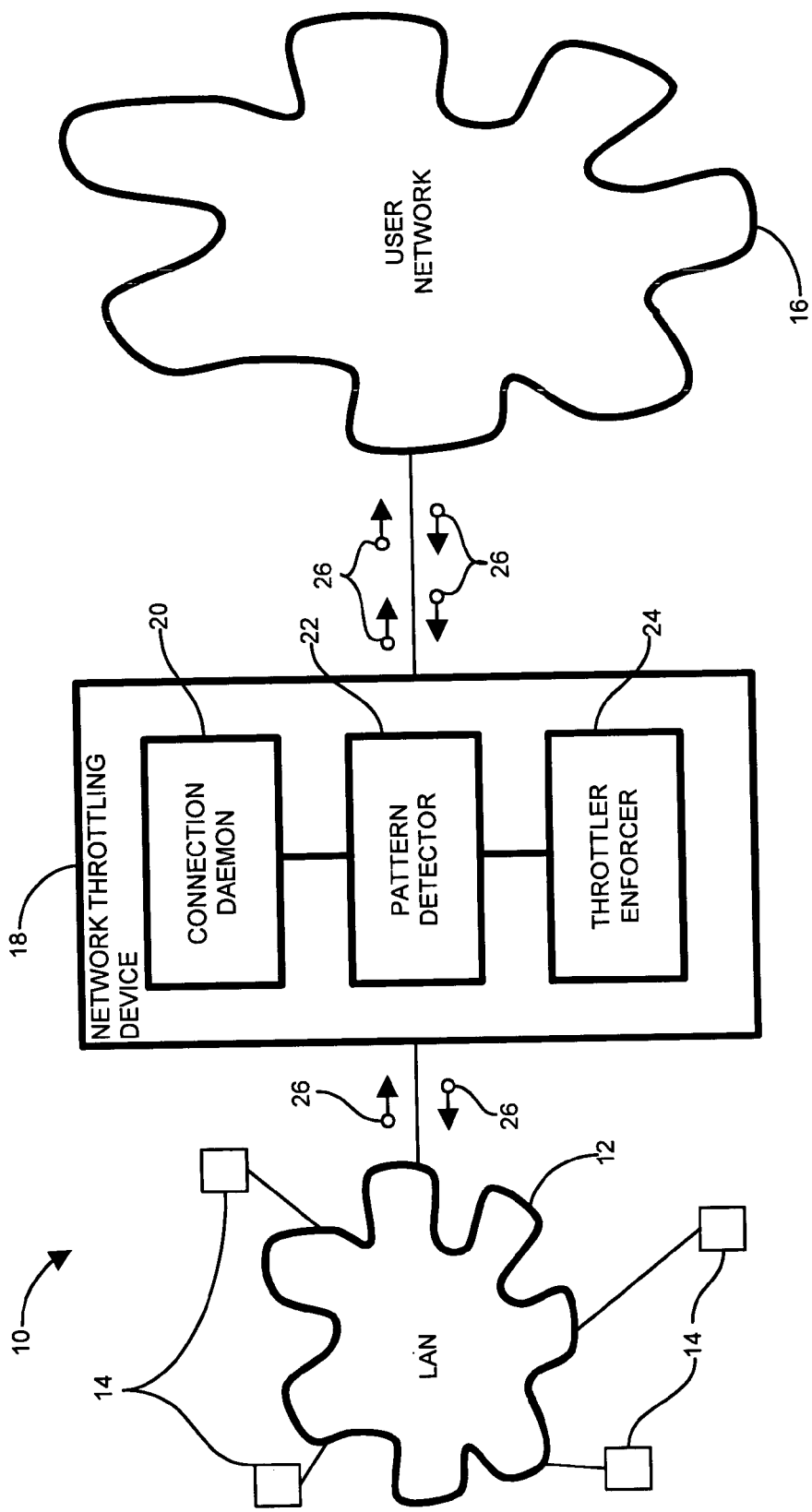
FIG. 1 is a context diagram of a communications network which is suitable for use with the present invention employing a network throttling device as defined herein.

FIG. 1 is a context diagram of a communications network 10 which is suitable for use with the present invention employing a network throttling device as defined herein. Referring to FIG. 1, the communications network 10 includes one or more LANs (Local Area Network) 12 including a plurality of user nodes 14, a larger user community network such as an enterprise-wide network or corporate intranet 16, and a network throttling device 18. The network throttling device 18 further includes a connection daemon 20, a pattern detector 22, and a throttler enforcer 24.

The LAN 12 interconnects the user nodes 14, and the LAN 12 itself connects to the Internet 16 through the network throttling device 18. The network throttling device 18 may employ or incorporate the functions of a switching device (not specifically shown) such as a router, bridge, or hub, as is known in the art. For illustrative purposes, the specific packet switching functions of such a switching device will not be specifically elaborated herein, however it should be understood that such capability, in particular configurations, typically interconnects such a LAN 12 and a larger user community network 16 such as a corporate LAN, WAN, or other enterprise-wide interconnection of users. Alternatively, a broader implementation includes an interconnection to a public access network such as the Internet. In particular implementations, the network throttling device operates to shield, or mitigate, undesirable activity on the throttled side from having a detrimental effect on the larger (other) side.

In operation, the user nodes 14 on the LAN 12 transmit and receive message traffic, typically according to a known protocol such as TCP/IP (Transmission Control Protocol/Internet Protocol), which employs message traffic in the form of packets 26. The LAN 12 forwards and receives the message traffic packets 26 to and from the Internet 16 through the network throttling device 18. The network throttling device 18 is operable to read and manipulate the packets 26 as described further below, and the LAN 12 is responsive to the network throttling device 18. The message traffic, for exemplary purposes, includes packets 26 as discussed herein, however alternate configurations may employ message traffic in other forms according to other protocols, such as Ethernet frames, ATM cells, streaming media, and the like, as is known in the art. Further, as TCP/IP connection attempts are employed as illustrative outgoing transmissions which demonstrate the principles of the invention. However, such exemplary connection attempts as discussed herein may, in alternate configurations, take the form of other outgoing transmissions, such as transmissions setting up an ordered set of data items, and include so-called "pings," ATM cells, Ethernet frames, and other data items operable for electronic transmission such as protocol based signals.

Figure 2:
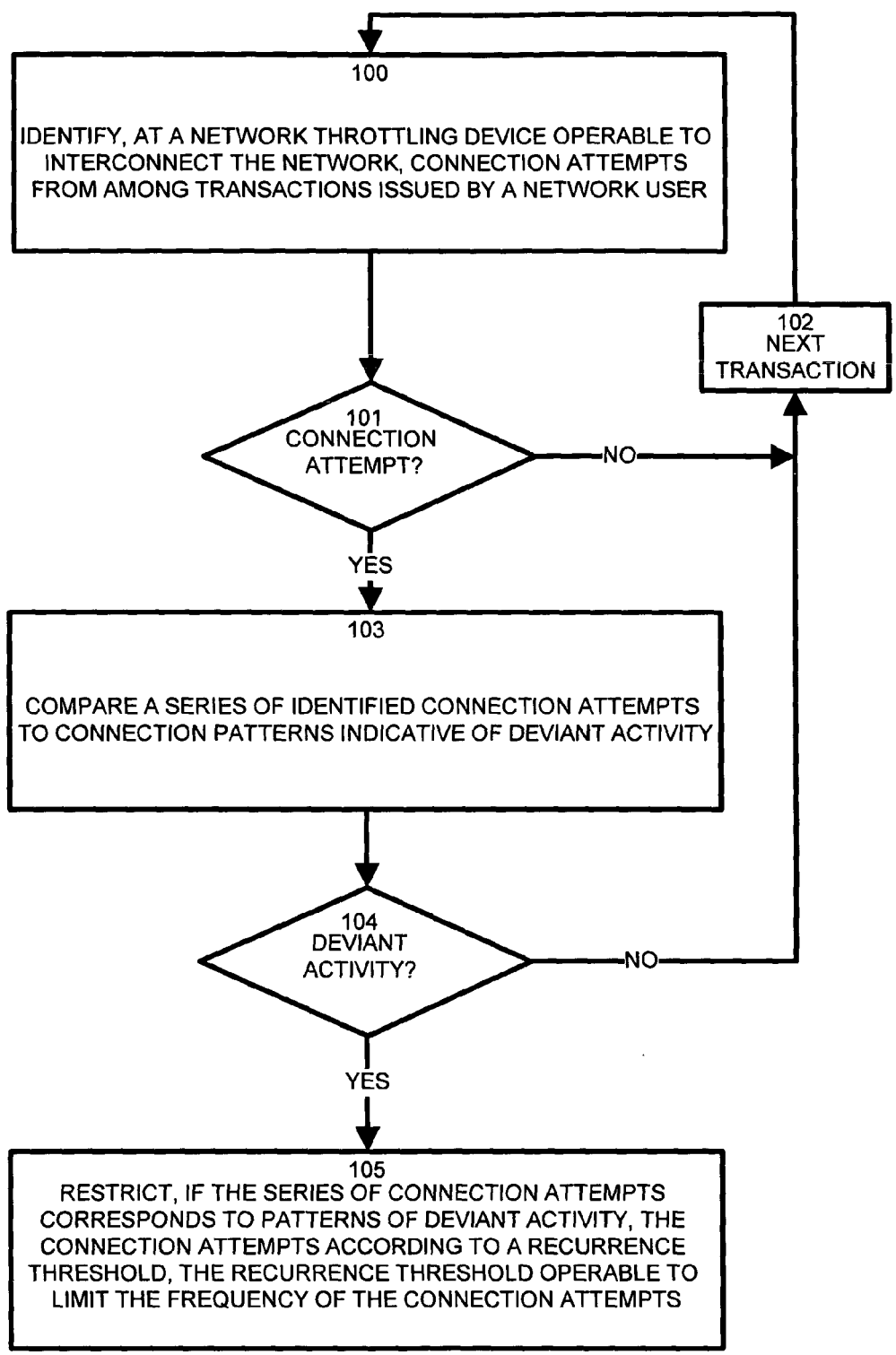
FIG. 2 is a flowchart of a method for detecting illicit network connections and controlling the network accordingly in the network throttling device of FIG. 1.

FIG. 2 is a flowchart of the method for detecting illicit network connections and controlling the subnetwork LAN 12 accordingly from the network throttling device 18 of FIG. 1. Referring to FIGS. 1 and 2, the method for network connection detection and throttling include identifying, at the network throttling device 18 operable to interconnect the network 12 to the Internet 16 (or other public access network), connection attempts from among transactions, or message traffic, issued by a network user 14. At step 100, the connection daemon 20 in the network throttling device 18 observers (reads) message packets 26 passing from the network 12 to the Internet 16. Such connection attempts may include an exchange of packets, or a transaction, such as a TCP Syn/Ack transaction between a user node 14 and a remote Internet 16 node. However, a single outgoing transmission from a purported suspect user initiates scrutiny, as activities such as "pings," which are known in the art to be a unilateral inquisitive transmission, are one form of scanning activity which constitutes a detectable pattern. Accordingly, detection occurs for various types of transmissions, which may be part of a transactional set of one or more messages (packets) and may include bi-directional or unidirectional transmissions. Nonetheless, a typical deviant pattern begins as a connection request. A connection request, whether legitimate or deviant, precedes successive payload packets 26, which are typically nondescriptive of deviant activity and further, deviant activity includes a majority of connection transaction packets 26. Accordingly, the connection daemon 18 identifies outgoing transmissions tending to be indicative of illicit activity such as transactions of packets 26 which are connection requests.

At step 101, the connection daemon 20 performs a check to determine if a particular transaction is a connection request, as described above. If it is not, at step 102, control reverts to step 100 for the next transaction. If the transaction is a connection attempts, then at step 103, the pattern detector 22 compares one or more of the recently identified connection attempts to connection patterns indicative of deviant activity. As indicated above, a single connection attempt, on its own, may not be deterministic, just as the single door handle attempt above. A series of successive or recent transactions, however, may indicate deviant patterns, as will be described further below. At step 104, the pattern detector performs a check to determine if the connection attempt matches a pattern of deviant activity. If not, at step 102, control again reverts to step 100 for the next transaction.

At step 105, if the check at step 104 indicates that the individual or series of connection attempts corresponds to patterns of deviant activity, then the throttler enforcer 24 restricts connection attempts according to a recurrence threshold, the recurrence threshold operable to limit the frequency of the connection attempts. The recurrence threshold specifies, based on a perception of threat computed by the throttler enforcer, a maximum frequency of allowable connection attempts. For example, a malicious virus attempts to establish many connections in a short period of time. Such a rate of connections far exceeds patterns of normal usage, such as web browsing. Further, malicious attempts such as viruses typically rely on a fast propagation rate such that many remote computers may be infected in a short time, so that remedial measures cannot occur until after substantial propagation of the virus. Accordingly, limiting the number of outgoing connection attempts to the recurrence threshold restricts propagation of the attacking virus without hampering normal message traffic.

Figure 3:
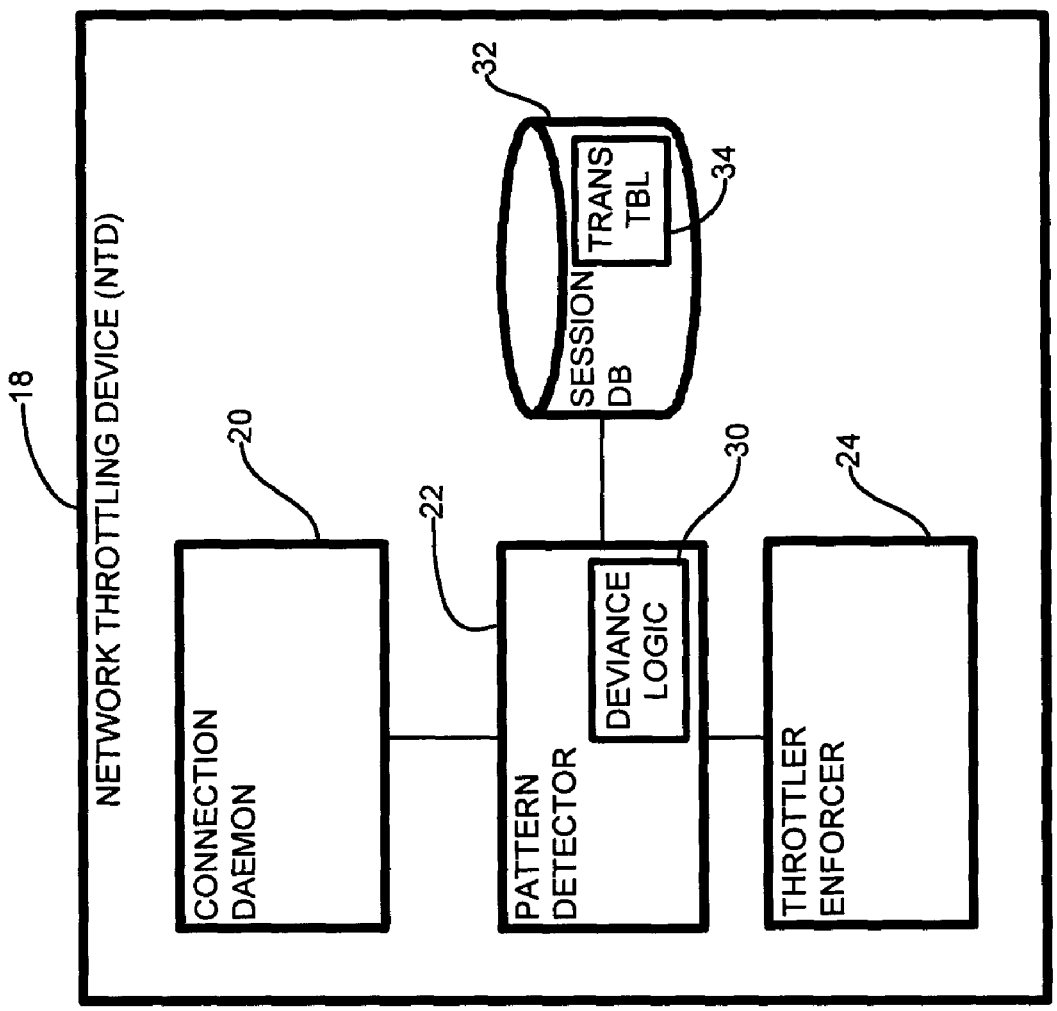
FIG. 3 shows a block diagram of the network throttling device of FIG. 1 in greater detail.

FIG. 3 shows a block diagram of the network throttling device 18 of FIG. 1 in greater detail. Referring to FIG. 3, the network throttling device (NTD) 18 includes the aforementioned connection daemon 20 and throttler enforcer 24. Further, the pattern detector 22 includes deviance logic 30 operable to compare patterns of transaction activity, and connects to a session database 32. The session database 32 is responsive to the pattern detector 22 and has a transaction table 34 for storing transaction information concerning a recent history of transactions from the connection daemon 20.

In operation, the connection daemon 20 passes the received transmissions, which may be in the form of packets, whole transactions, or other exchange, to the pattern detector 22. The pattern detector 22 invokes the deviance logic 30 to determine if current transmissions match a pattern of deviant activity with patterns stored in the session database 32. The pattern detector 22 retrieves transactions from the transaction table 34, shown in further detail below with respect to FIG. 7, and compares them to new transactions 26 sent from the connection daemon, according to the deviance logic 30, to compute if a deviant transaction is present. If the deviance logic 30 indicates a deviant pattern, the pattern detector 22 passes the transaction information to the throttler enforcer 24 so that the throttler enforcer 24 may restrict future transactions from the offending user 14.

Figure 4:
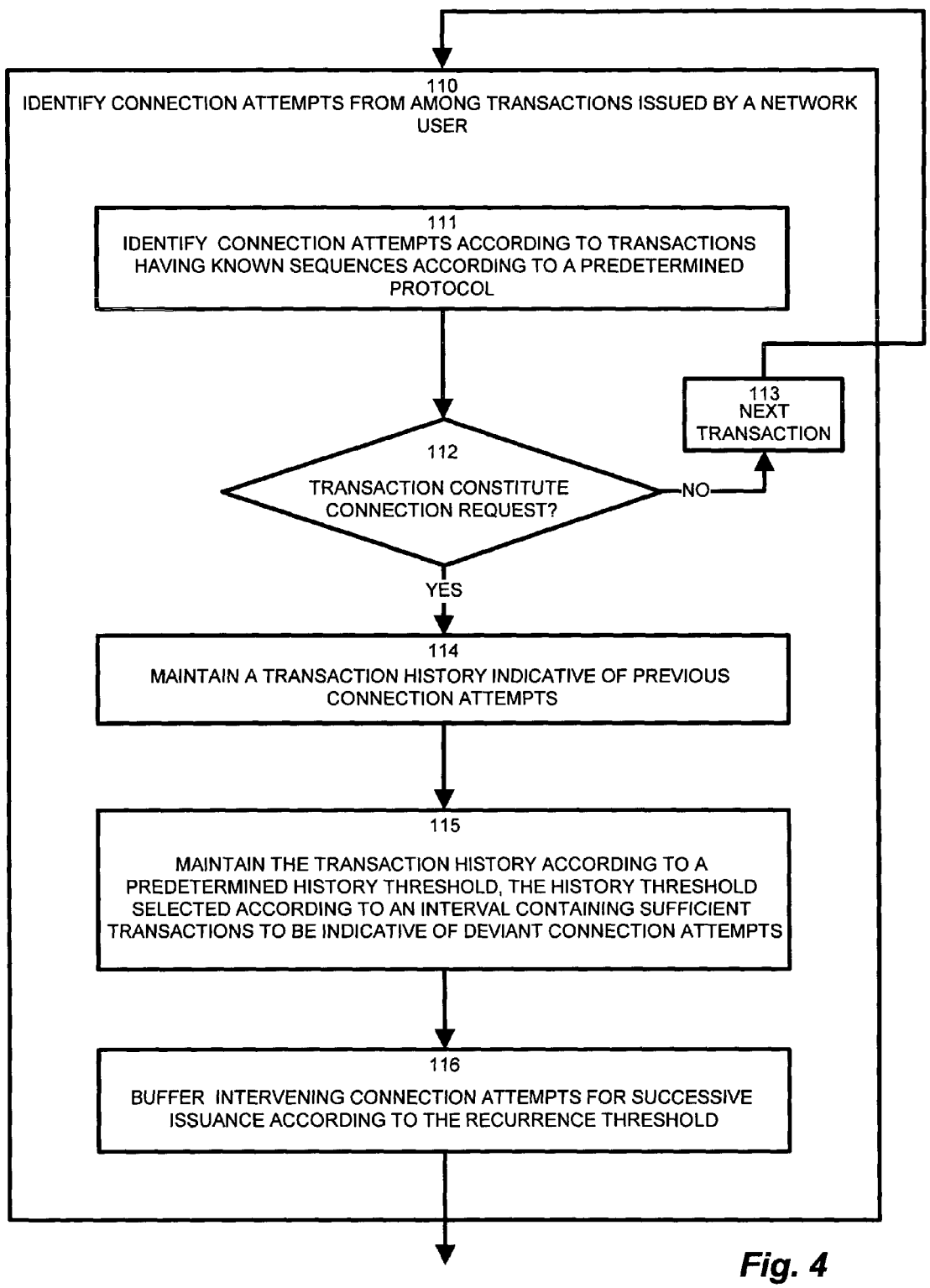
FIGS. 4 and 5 are a flowchart of the network throttling device of FIG. 3 detecting and throttling the network in greater detail.
Figure 5:
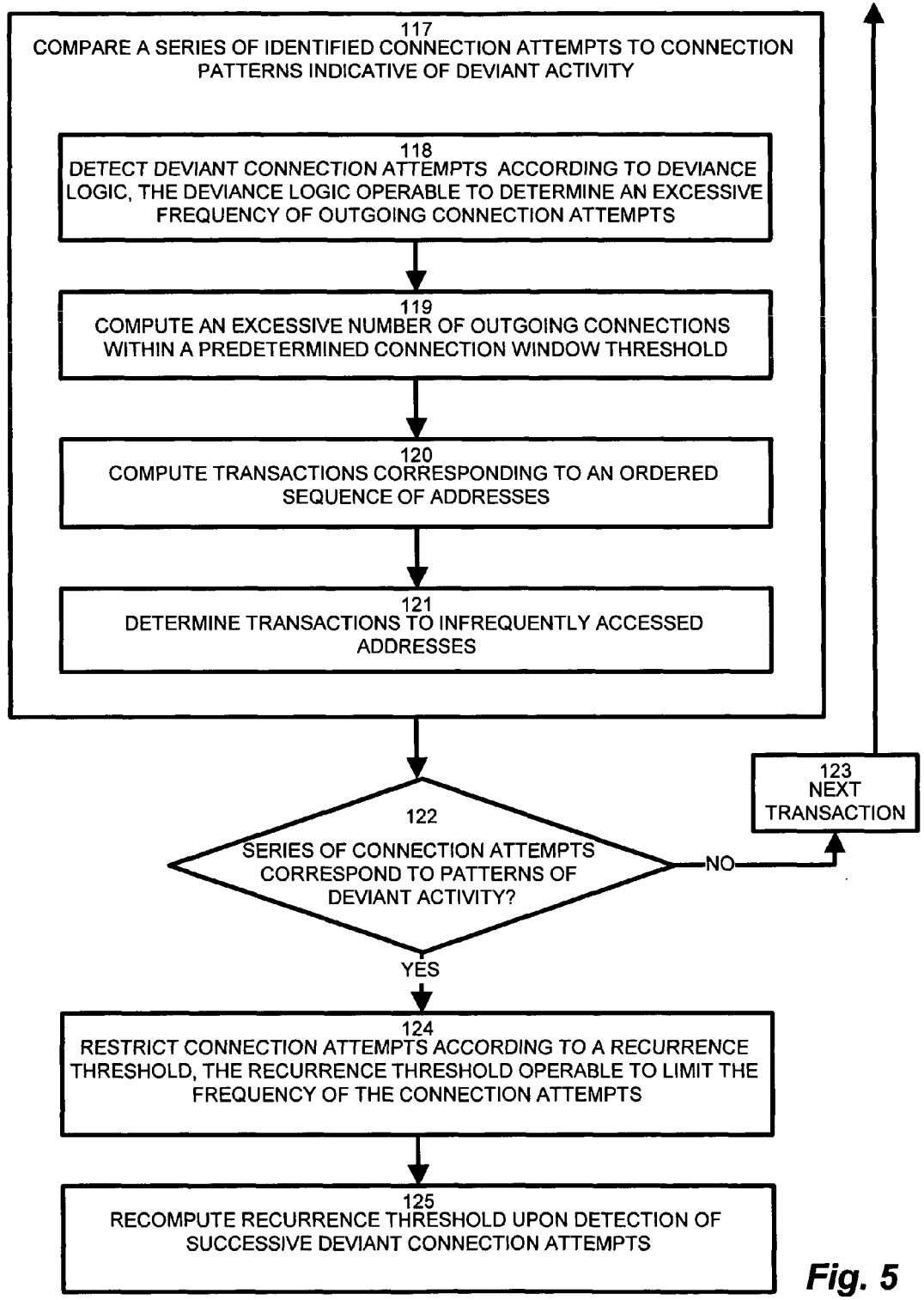

FIGS. 4 and 5 are a flowchart of the network throttling device of FIG. 3 detecting and throttling the network as in FIG. 2 in greater detail. Referring to FIGS. 1, 3, 4 and 5, at step 110, the connection daemon 20 identifies connection attempts from among transactions 26 issued by a network user 14, as expanded below in steps 111-116.

At step 111, the connection daemon 20 identifies the connection attempts according to transactions 26 having known sequences according to a predetermined protocol. In the exemplary network illustrated in FIGS. 1 and 3, the TCP/IP protocol exhibits connection attempts identifiable by certain predetermined byte sequences. Values in the observed packets 26 match certain predetermined values known for a connection attempt to begin a session. In a TCP/IP session, a Syn packet 26 (Syn) is sent by the initiating node 14, and the receiving node sends an Ack packet 26 (Ack). These packets constitute a connection attempt transaction, which the connection daemon 20 identifies. In alternate arrangements, alternate protocols, such as ATM, Ethernet, and others, exhibit similar initiation sequences to begin a session or otherwise identify a transaction a user might employ to infiltrate (attack) a remote node.

At step 112, a check is performed, similar to 101, to determine if the connection daemon found a connection attempt. If not, at step 113, control reverts to step 110 for the next transaction. If the connection daemon finds a connection request transaction, at step 114, the pattern detector receives the transaction and maintains a transaction history indicative of previous connection attempts by storing the transaction in the transaction table 34 in the session database 32.

At step 115, the session DB 32, in response to the pattern detector 22, stores the transaction in the transaction table 34 to maintain the transaction history according to a predetermined history threshold, the history threshold selected according to an interval containing sufficient transactions to be indicative of deviant connection attempts. Therefore, the transaction table 34 stores a sufficient number of previous transactions to such that the deviance logic 30 is able to match and identify a deviant pattern. For example, a single stored IP address in a connection transaction followed by a connection attempt to the next IP address might be a mere coincidence. If the session DB 32 stores no additional transactions, such an occurrence might not trigger deviant activity. If, however, five previously stored connection transactions were all to incrementally increasing addresses, deviant activity seems more likely.

At step 116, some of the transactions in the table 34 may be transactions which the throttler enforcer 24 may restrict. Accordingly, the session DB should buffer intervening connection attempts for successive issuance according to the recurrence threshold. Restricted transactions should occur at a frequency according to the recurrence threshold, which should ensure that an excessive rate of the connection transactions does not occur. The restricted transactions should not be merely dropped, but rather occur at the "safe" time. Note that the transactions in the transaction table 34 are, of course, the transactions which the pattern detector reads for the transaction history check. Therefore, the transaction buffer of potentially pending transactions is at least as long as the transaction history.

At step 117, the pattern detector 22 compares a series of the identified connection attempts to connection patterns indicative of deviant activity. The pattern detector 22 compares the current transaction to the transaction history of previous transactions to determine if there is a deviant pattern. Such a deviant pattern is one or more transactions 26 outside the range of patterns of normal, benign transactions and which are therefore possible attack attempts.

At step 118, the pattern detector detects deviant connection attempts according to the deviance logic, the deviance logic operable to determine an excessive frequency of outgoing connection attempts. Several checks are performed to address different patterns of activity which are outside the typical set of observable patterns for normal, benign user activity. In a particular configuration, the deviance logic is a modifiable, upgradeable component of hardware and/or software which is operable to receive updates of additional pattern data and logic for identifying deviant and/or malicious activity.

At step 119, the deviance logic compares and computes an excessive number of outgoing connections within a predetermined connection window threshold. A typical user will generate outgoing connections at a particular rate depending on the activity at hand. A user operating a web browser session might generate a new connection to a site of interest every few minutes. The connection window threshold indicates a period of time in which a predetermined number of connections constitutes excessive connections, and therefore deviant activity. For example, one might consider an average of one web site per minute acceptable. Such a heuristic would deem a time interval less than a minute between connections as excessive. However, consider that many people typically scan several websites quickly before settling on a site to browse or read more extensively. The scanned websites may not be viewed for a minute, however, once settling on a site the user may not advance to another site for 5 or 10 minutes. Accordingly, a connection window threshold may be 5 minutes with a maximum of 10 connections. Therefore, a user could quickly scan up to 10 sites until settling on one to peruse in more depth without triggering a deviant activity threshold.

At step 120, the deviance logic 30 computes transactions corresponding to an ordered sequence of addresses. Typical attacks involve scanning sequential IP addresses, or by a regular increment (every other, every $3^{rd}$, etc) and are therefore characterized by a pattern of successive multiples. The transaction data from the connection daemon 20 includes the source address and the destination address for the connection, as will be described further below with respect to FIG. 7. Such an attack appears as successive connections to the sequence of addresses accompanied by an overly high failure rate, since the initiator 14 has no reason to expect the connection to succeed. This type of attack is akin to the thief attempting the door handle of a line of parked cars described above. The deviance logic 30 might observe connection attempts to a predetermined number of sequential addresses, such as 3 or 4, which are unlikely to occur for normal, benign, message traffic. Accordingly, the deviance logic 30 reports the behavior as a deviant pattern of activity.

Further, the deviance logic also considers source addresses when analyzing successive connection attempts. In the above example, such activity likely occurs from the same malign user 14 (initiator), hence the transaction carries incremental connection destinations emanating from the same source address. However, alternate patterns are possible. For example, the initiator may employ a dynamic address, such as via a DHCP (Dynamic Host Configuration Protocol) server. In this example, the source address would change as the initiator sought a new DHCP address. For this reason, the transaction data includes the MAC (Media Access Control) address for the initiator's machine, in addition to the source IP address.

Many users access a common subset of addresses frequently. Accordingly, accesses to regularly used addresses are less likely to be the result of malicious activity. At step 121, the deviance logic 30 determines transactions to infrequently accessed addresses. Such addresses, in a particular arrangement, are addresses not stored as part of the transaction history list in the transaction table 34. Alternatively, the deviance logic may set a different threshold for infrequently accessed addresses, since a connection to a new address is not as characteristic of malign activity as sequential addresses. Accordingly, the deviance logic might not deem a new address pattern as a deviant pattern until a relatively large number of new address transactions occur within a relatively short time.

At step 122, the pattern detector 22 performs a check based on the result from the deviance logic 30. If the pattern detector 22 does not observe a deviant pattern, then at step 123, control reverts to step 110 for the next transaction. If the pattern detector observes a pattern corresponding to deviant activity, then, at step 124, the throttler enforcer 24 restricts the connection attempts according to the recurrence threshold, the recurrence threshold operable to limit the frequency of the connection attempts.

As discussed above, such malicious attacks typically rely on the ability to generate many outgoing connections very rapidly prior to being detected and shut down. Such a rate is much greater than a rate of connections which an ordinary benign user 14 generates. For example, a malicious virus exhibiting port scanning propagation techniques generates connections on the order of hundreds of times a second, much greater than a typical web browser session, even for a proficient user.

However, certain user patterns may generate patterns which evoke discriminating determinations by the pattern detector 22. For example, a web auction page may display many auction item icons. Each of those icons references the particular auction item on the auctioning user's computer. Further, such auction items may generate several links, such as a text description of the auction item and multiple pictures of the auction item. In the event that the related links for the auction item are distributed, a user browsing a single auction item may evoke multiple connections to different machines. Nonetheless, such an auction scenario is unlikely to generate a connection rate on the order of hundreds of connections a second, and accordingly, the deviance logic 30 checks of steps 119-121 should therefore evade false alarms.

As disclosed above, the recurrence threshold corresponds to the frequency at which the user 14 exhibiting deviant behavior may attempt additional connections. At step 125, the deviance logic 30 recomputes the recurrence threshold, particularly in the case of detection of additional triggers of deviant transmission from successive deviant connection attempts. For example, a user 14 triggering a deviance activity limitation, resulting from, say, excessive connection attempts of 1/sec, and therefore being limited to 1/10 seconds, is further limited to 1 every 30 seconds upon recurrent connection attempts every second. However, the deviance logic 30 may also reduce the recurrence threshold to mitigate possible malign interpretation of benign connection activities. In the above example, a surge of connection attempts resulting from an HTML page with overabundant outgoing references (i.e. embedded URLs), and therefore triggering the recurrence threshold limitation, abates to remove the limitation once the surge of connection attempts subsides.

The deviance logic 30 is operable to recompute the recurrence threshold according to a variety of factors. In particular arrangements, the deviance logic 30 recomputes recurrence threshold in a graduating manner proportional to the frequency of connection attempts. In a further arrangement, the deviance logic computes the recurrence threshold according to a binary exponential backoff, such as is typical in a multiple access collision detect system such as Ethernet. Other factors may be employed, such as the type and volume of throughput, the frequency of detecting deviant activity triggering defense limitations, and the potential damage from a successful attack.

Figure 6:
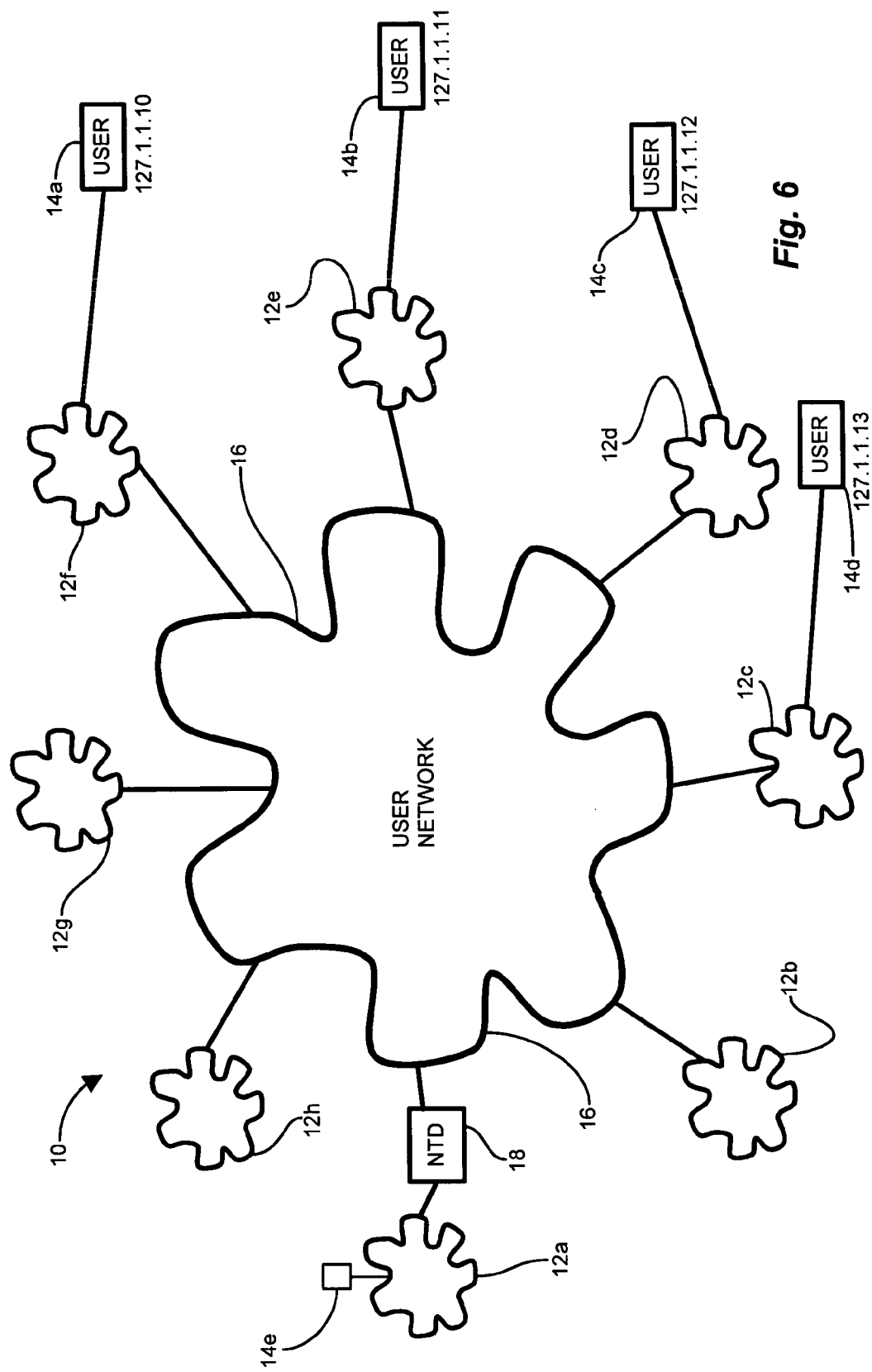
FIG. 6 is a diagram of an exemplary communications network employing the communications system of FIG. 1 between an edge network and a core network.

FIG. 6 is a diagram of an exemplary communications network 10 employing the communications system of FIG. 1, and FIG. 7 is the transaction table 34 in the session database 32 of FIG. 3 in greater detail as employed in the example of FIG. 6. Referring to FIGS. 6 and 7, in the communications network 10 of FIG. 6, each of the subnetworks 12a-12h is one of a LAN 12 comprising a subset of a larger network (16 and 12a-12h, collectively) and the network throttling device 18 is an isolated connection thoroughfare from the network to the larger network. Alternate arrangements may position the network throttling device 18 as one of several paths, or may not completely isolate the connection thoroughfare to the subnetwork 12. Many alternate topographical configurations will be apparent. The network throttling device 18 remains nonetheless operable to detect and limit connection traffic on the network path on which it resides.

FIG. 6 shows exemplary users 14a-14d on the Internet 16 accessible via the network throttling device 18 from the edge network (subnetwork) 12a. User 14e, residing on the subnetwork 12a, attempts to connect to the remote nodes 14a-14d, as will now be described.

The transaction table 34 stores a plurality of fields including IP address of the source 42a, MAC (Media Access Control) address of the source 42b, protocol in use 42c, the destination IP address 42d, and the date and time stamp 42e of the attempt. Other values may be stored in alternate configurations. The pattern detector 22 stores the fields 42a-42e for each of the transactions 44a-44d which the connection daemon 20 identifies as connections, and therefore as relevant to potential deviant activity. Transactions 44a and 44b correspond to connection attempts from the same IP address 42a to adjacent destinations 42d occurring one second apart, per the timestamp 42e field. In this example, use the parameters of a connection window threshold of 3 minutes and an excessive number of connections as 3. Since entries 44a and 44b identify only two attempts, the pattern detector 22 does not indicate deviant activity by this check.

Now, by way of further example, transaction 44c occurs. Transaction 44c occurs to the next sequential destination 42d one second later 42e, from the same IP address 42a. Accordingly, three connection transactions within three minutes occurs, as two minutes have elapsed from the timestamp 42e of entries 44a and 44c, respectively. Further, all three destination addresses are incremental by one, so the deviance logic 30 would also trigger an ordered sequence address threshold of three consecutive addresses to the pattern detector 22. Note that an ordered sequence may also differ by a regular interval other than one.

If, however, the connection window was longer, or the excessive connections threshold was four, for example, the above scenario would not indicate deviant activity and initiate the resultant restriction. Entry 44d occurs, to the next destination address 42d in the sequence, therefore seeming to satisfy a criteria of four sequential connections in three minutes. However, the user/attacker 14e employs DHCP to obtain a different IP address 42a. Accordingly, a check for similar source IP addresses 42a for the four transactions does not match. However, the deviance logic 30 also examines the MAC address field 42b, and determines that the MAC addresses do match for all four transactions 44a-44d. Therefore, the deviance logic 30 determines that deviant activity is occurring. Since the MAC address corresponds more directly to the machine of the deviant user 14e, this check serves to catch attempts to elude detection by dynamic reallocation of addresses such as via a DHCP request.

The above description with respect to FIGS. 6 and 7 is illustrative by way of example only. Alternate examples of different thresholds and different network configurations occur in alternate network configurations. The edge network, or subnetwork 12 and Internet configuration may be any network interconnection between which a network administrator or deployment entity disposes a network throttling device 18 as described above.

Further, message packets 26 and transactions which the connection daemon 20 and pattern detector 22 identify as deviant may conform to alternate protocols. The exemplary identification of message packets 26 described above is also applicable for identifying and responding to message data payload and control routing traffic of alternate protocols.

Similarly, the deviant activity described above as an attack on network resources may be the result of a variety of circumstance, either malicious, unintentional, or ignorant. Unintentional misuse and erroneous invocation of network resources in a manner which consumes a disproportionate or inequitable share of network resources will benefit from the detection and throttling remedial action disclosed above.

Those skilled in the art should readily appreciate that the programs and methods for network connection detection and throttling as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object. Alternatively, the operations and methods disclosed herein may be embodied in whole or in part using hardware components, such as Application Specific Integrated Circuits (ASICs), state machines, controllers or other hardware components or devices, or a combination of hardware, software, and firmware components.

While the system and method for network connection detection and throttling has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A network edge device, comprising:
   one or more processors;
   a receive logic to receive a network traffic from a first network;
   a connection daemon logic to detect and intercept connection attempts from a plurality of sources in the network traffic;
   wherein a connection attempt pertains to opening a TCP/IP connection for communicating data packets;
   a pattern detector logic to identify a deviant source from the plurality of sources by comparing a series of connection attempts from one or more of the plurality of sources to a set of connection patterns that identify deviant activity;
   a throttler enforcer logic to buffer connection attempts from the deviant source to produce buffered connection attempts and to issue the buffered connection attempts to a second network according to a recurrence threshold based on a binary exponential backoff algorithm; wherein the throttler enforcer logic is configured to reduce bandwidth provided to the deviant source; and
   an output logic to output the network traffic to the second network;
   wherein the throttler enforcer logic increases the recurrence threshold based, at least in part, on an indication by the pattern detector logic that the deviant source is continuing deviant activity; and
   wherein increasing the recurrence threshold delays issue of the buffered connection attempts.

2. The network edge device of claim 1, comprising a session database, where the pattern detector logic stores a transaction history for the connection attempts from the plurality of sources in the session database according to a history threshold, where the history threshold is a length of time sufficient to establish the series of connection attempts.

3. The network edge device of claim 2, where the pattern detector logic associates the incoming connection attempts with previously received connection attempts from a same source in order to correlate the series of connection attempts.

4. The network edge device of claim 1, where the deviant activity is port-scanning.

5. The network edge device of claim 1, where a source is tracked according to a Media Access Control (MAC) address.

6. The network edge device of claim 1, where the set of connection patterns include patterns indicating an excessive number of connection attempts within a predetermined connection window threshold.

7. The network edge device of claim 1, where the set of connection patterns include patterns indicating attempts to connect with an ordered sequence of addresses.

8. The network edge device of claim 1, where the set of connection patterns includes attempts to connect with infrequently accessed addresses.

9. The network edge device of claim 1, where the first network is an untrusted network.

10. The network edge device of claim 1, where the connection attempts are Transmission Control Protocol (TCP) connection requests.

11. The network edge device of claim 1, where continuing deviant activity includes continuing to send connection attempts.

12. Logic encoded in a non-transitory computer storage readable medium for execution and when executed operable to cause one or more processors to perform:
   receiving a network traffic from a first network;
   detecting and intercepting incoming connection attempts from a plurality of sources in the network traffic;
   wherein a connection attempt pertains to opening a TCP/IP connection for communicating data packets;
   identifying a deviant source from the plurality of sources by comparing a series of connection attempts from one or more of the plurality of sources to a set of connection patterns that identify deviant activity;

buffering connection attempts from the deviant source to produce buffered connection attempts and issuing the buffered connection attempts to a second network according to a recurrence threshold;

wherein the buffering connection attempts comprise reducing bandwidth provided to the deviant source;

increasing the recurrence threshold based, at least in part, on an indication that the deviant source is continuing deviant activity;

wherein increasing the recurrence threshold delays issue of the buffered connection attempts;

wherein the recurrence threshold is increased according to a binary exponential backoff algorithm;

outputting the network traffic to the second network;

wherein the steps of intercepting, identifying and buffering are performed by one or more computing devices.

13. The logic of claim 12 comprising:
maintaining a history of connection attempts for the plurality of sources.

14. The logic of claim 12 comprising:
associating the incoming connection attempts with previously received connection attempts from a same source in order to correlate the series of connection attempts.

15. A system comprising:
one or more processors;
means for receiving a network traffic from a first network;
means for detecting and intercepting incoming connection attempts from a plurality of sources in the network traffic;
wherein a connection attempt pertains to opening a TCP/IP connection for communicating data packets;
means for identifying a deviant source from the plurality of sources by comparing a series of connection attempts from one or more of the plurality of sources to a set of connection patterns that identify deviant activity;
means for buffering connection attempts from the deviant source to produce buffered connection attempts and means for issuing the buffered connection attempts to a second network according to a recurrence threshold;
wherein the buffering means comprises means for reducing bandwidth provided to the deviant source;
means for increasing the recurrence threshold based, at least in part, on an indication that the deviant source is continuing deviant activity;
wherein increasing the recurrence threshold means comprises means for delaying issue of the buffered connection attempts;
wherein the recurrence threshold is increased according to a binary exponential backoff algorithm;
means for outputting the network traffic to the second network.

16. The system of claim 15, further comprising means for storing a transaction history for the connection attempts from the plurality of sources in a session database according to a history threshold, wherein the history threshold is a length of time sufficient to establish the series of connection attempts.

17. The system of claim 16, further comprising means for associating the incoming connection attempts with previously received connection attempts from a same source in order to correlate the series of connection attempts.

18. The system of claim 15, where the deviant activity is port-scanning.

* * * * *